Jan. 26, 1932.　　　　C. E. REYNOLDS　　　　1,842,687
WATER LEVEL MAINTAINING DEVICE FOR VASES
Filed May 23, 1930

INVENTOR
C. E. Reynolds
BY
ATTORNEY

Patented Jan. 26, 1932

1,842,687

UNITED STATES PATENT OFFICE

CHARLES E. REYNOLDS, OF STOCKTON, CALIFORNIA

WATER LEVEL MAINTAINING DEVICE FOR VASES

Application filed May 23, 1930. Serial No. 454,943.

This invention relates to device for replenishing the supply of water to cut flowers in vases and containers of various kinds such as are used for supporting flowers in florist shops, cemeteries, in front of the crypts in mausoleums, and in fact any places where cut flowers are kept or displayed to view. These vases or containers are always filled when the flowers are initially placed therein, but this initial filling is soon depleted by absorption by the flowers, and if no more water is supplied the flowers of course soon wither.

The principal object of my invention is to provide a device adapted to be mounted in the container or vase in connection with the flowers therein by means of which a fresh supply of water will be discharged into the container when the water drops to a predetermined level so that the water will be maintained at such level and will not then drop below the same or to a point where the stalks would not reach the water and would become dry.

A further object is to construct a device so that it may be easily adjusted to discharge water at different levels as the length of the stalks and other conditions may demand. The water containing reservoir of the device is made so as to be inconspicuous so that while located above the top of the vase it will not spoil the appearance of the bouquet in which it is disposed.

A further object of the invention is to produce a simple and inexpensive device and yet one which will be exceedingly effective for the purpose for which it is designed.

These objects I accomplish by means of such structure and relative arrangement of parts as will fully appear by a persual of the following specification and claims.

In the drawings similar characters of reference indicate corresponding parts in the several views.

Figure 1:
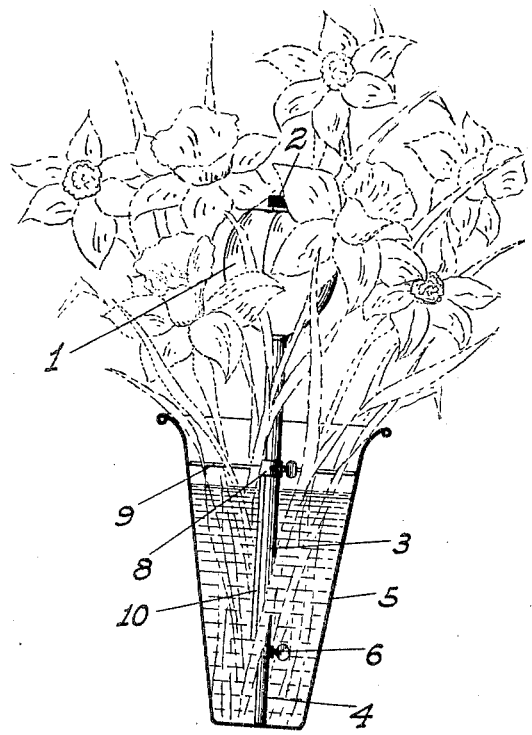
Fig. 1 is a sectional elevation of a flower container showing my water refiller device mounted therein in connection with a bouquet.

Referring now more particularly to the characters of reference on the drawings, the device comprises a water receptacle 1, provided with a top filling opening normally covered by an air-tight cap 2. This receptacle is preferably made of ornamental form and coloring, either in imitation of a flower, a bird, or other feature of nature so that it will harmonize with most flowers and be inconspicuous when surrounded by flowers in a bouquet as shown in Fig. 1.

A tube 3 depends from the bottom of the receptacle and a rod 4 is slidable in and depends from this tube. The rod is adapted to rest on the bottom of a vase or flower-container 5 and has an adjustable collar 6 mounted thereon against which the bottom of the tube bears. In this way the distance from the bottom of the container to the bottom of the tube (which is the level at which the water issues) may be varied according to the level at which it is desired that the water shall be supplied to the container. In order to permit the water to flow from the tube while maintaining the rod with a fairly close fit in the tube, said rod is grooved down one side as shown at 7. This groove extending past the collar, prevents the collar choking or preventing the flow by engagement with the tube. The same result may of course be obtained by making the rod with a relatively loose fit in the tube.

The tube is of sufficient length so that it will project some distance above the top of the container 5, and intermediate its ends it carries an adjustable collar 8 from which arms 9 radiate. This forms a spider adapted for engagement with the sides of the container so as to centralize the device and hold the same in an upright position in the container. At the same time it does not interfere with the stalks of the flowers which of course depend past the spider.

The principle on which the device operates is that water will not flow from an air-tight receptacle unless air is admitted thereto, which in the present case will only occur when the level of water in the container drops to the bottom of the tube, thus exposing the same and permitting air to pass up into the receptacle. This will of course allow water to be discharged from the tube until the level of the water in the container is raised to again cover the bottom of the tube, thus again shutting off the flow of air and water.

Figure 2:
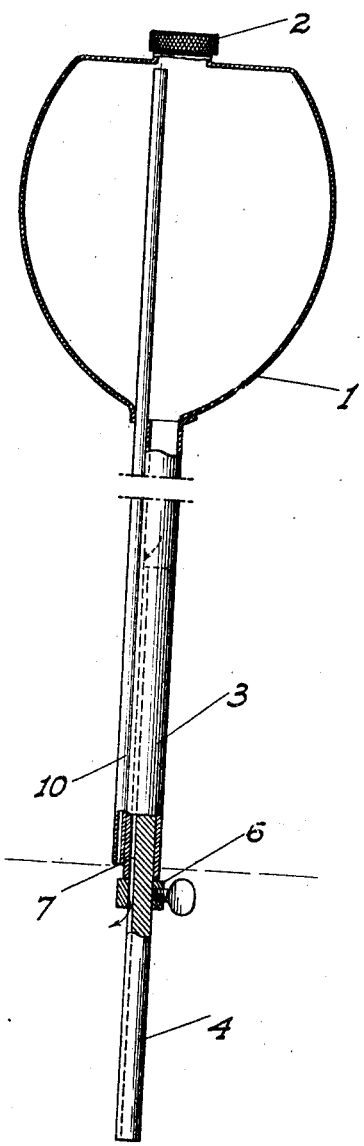
Fig. 2 is a side elevation of the device foreshortened and partly in section.
Figure 3:
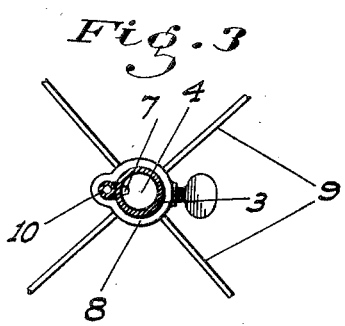
Fig. 3 is a cross section of the device taken a short distance below the water container.

Owing to the necessary small size of the tube and the partial clogging of the same by the rod 4, it may be necessary to mount an additional air tube 10 alongside the water tube, which air tube terminates at its lower end on substantially the same level as the water tube, but extends upwardly into the receptacle toward the top of the same, as shown in Fig. 2.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device for maintaining a constant water-level in a flower container comprising an air-tight water receptacle, a water outlet tube depending from said receptacle and adapted to depend into a container, and means on the device projecting below the tube to support the device from the bottom of the container so that the bottom of the tube is disposed a predetermined distance above the bottom of the container.

2. A device as in claim 1, with means mounted on the device and separate from the container for centralizing and maintaining the same in an upright position in the container.

3. A device as in claim 1, with a spider mounted on the tube and including radiating arms to engage the sides of the container.

4. A device for maintaining a constant water-level in a flower container comprising an air-tight water receptacle, a water outlet tube depending from said receptacle and adapted to depend into a container, a rod slidably mounted in and depending from the tube to engage the bottom of the container, and means between the rod and tube for maintaining the two in any predetermined positions relative to each other.

5. A device for maintaining a constant water-level in a flower container comprising an air-tight water receptacle, a water outlet tube depending from said receptacle and adapted to depend into a container, a rod slidably mounted in and depending from the tube to engage the bottom of the container, and an adjustable collar on the rod below the tube to be engaged by the bottom of the tube.

6. A structure as in claim 5, in which the rod and collar are arranged so as not to interfere with the flow of water from the tube into the container.

In testimony whereof I affix my signature.
CHARLES E. REYNOLDS.